United States Patent [19]
Cheng

[11] Patent Number: 5,624,199
[45] Date of Patent: Apr. 29, 1997

[54] SETTING DEVICE FOR A JOINT

[76] Inventor: Chin-chang Cheng, No. 20, Lane 327, Sec. 2, Chung Shan Rd., Chung Ho City, Taipei Hsien, Taiwan

[21] Appl. No.: 536,799

[22] Filed: Sep. 29, 1995

[51] Int. Cl.[6] .................................................. F16C 11/00
[52] U.S. Cl. ............................... 403/100; 403/96; 403/92
[58] Field of Search ........................ 403/100, 91, 92, 403/96, 103, 84, 85, 94, 95; 280/655.1, 655, 47.371

[56] References Cited

U.S. PATENT DOCUMENTS

| | | | |
|---|---|---|---|
| 1,500,132 | 7/1924 | Hummelgard | 403/96 X |
| 4,261,596 | 4/1981 | Douglas | 403/92 X |
| 4,614,453 | 9/1986 | Kassai | 403/100 X |
| 4,666,327 | 5/1987 | Su | 403/96 X |
| 5,353,892 | 10/1994 | Lu | 403/96 X |
| 5,470,037 | 11/1995 | Willis | 403/84 X |
| 5,485,655 | 1/1996 | Wang | 403/100 X |

Primary Examiner—Harry C. Kim
Attorney, Agent, or Firm—Kolisch, Hartwell, Dickinson, McCormack & Heuser

[57] ABSTRACT

A setting device for a joint comprises a box-like body with a U-shaped opening therein, a lower tube fixedly secured in the opening, an upper tube pivotally secured in the opening, a plurality of location holes defined through a face of the body in a semi-circular arrangement, a flexible retaining member contained within the upper tube and a lug thereof extended through the upper tube and one of the plurality of holes in body, and a pivot arm pivotally secured to the body. The upper tube may be pivotally extended away from the lower tube and retained in position by the lug which projects beyond the face of the body, and the pivot arm resting against a stop of the body. The pivot arm is moved to depress the lug into the upper tube, so that the upper tube can be moved to a second position.

10 Claims, 3 Drawing Sheets

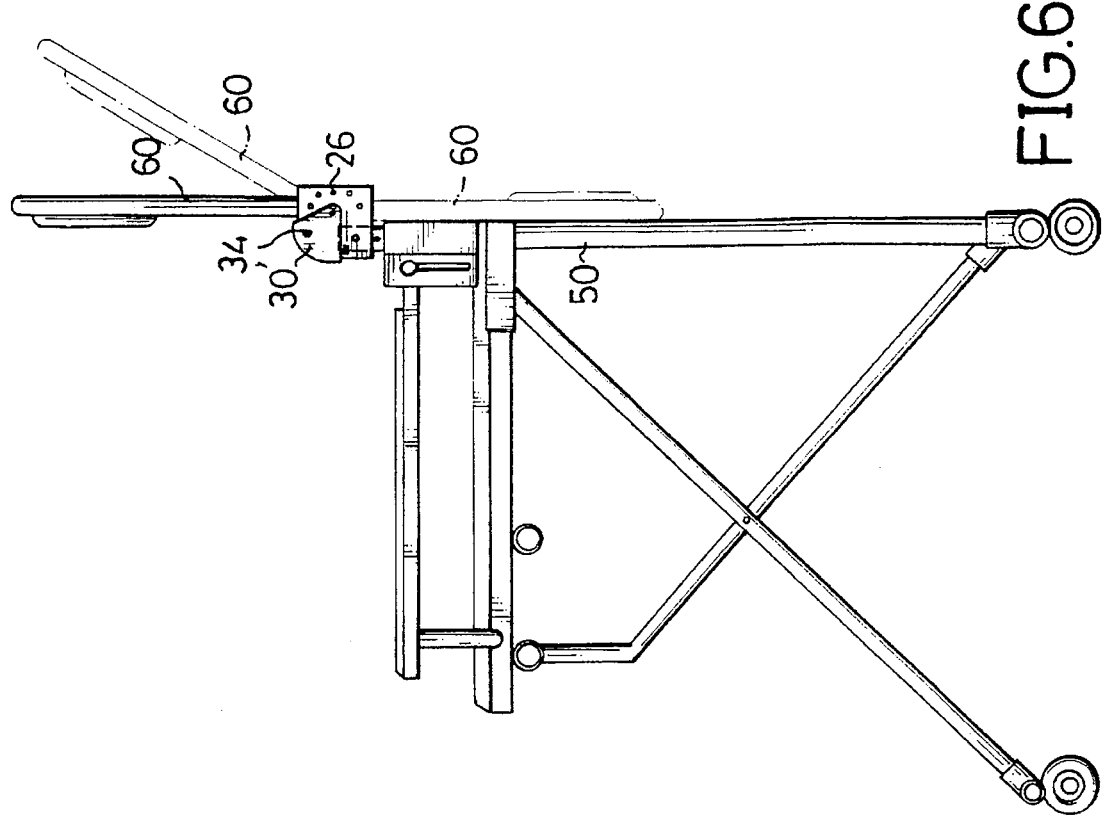
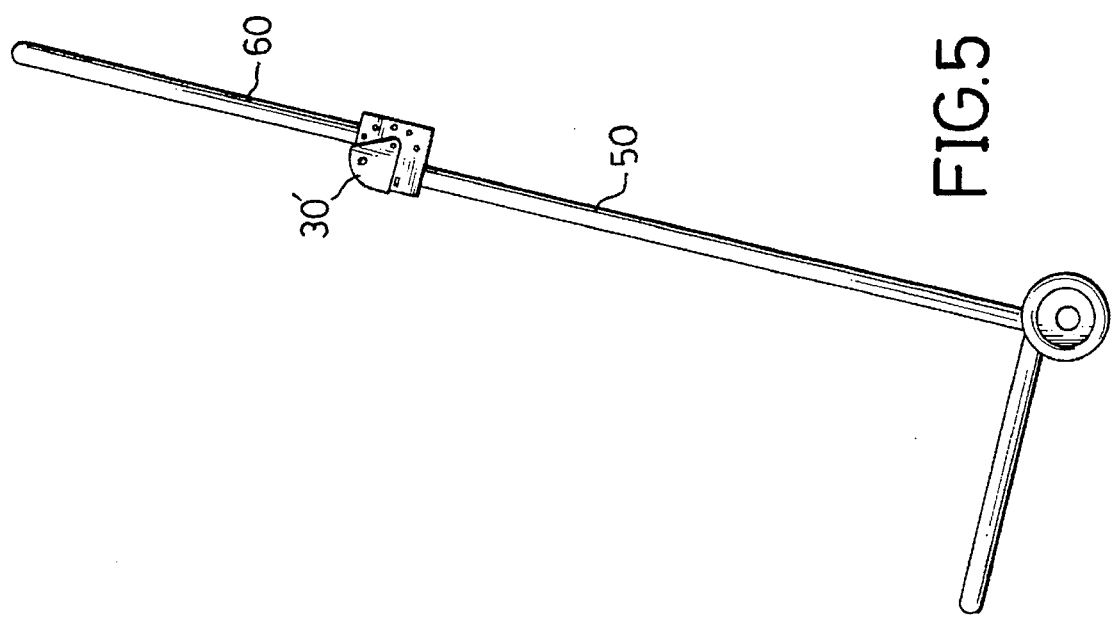

5,624,199

SETTING DEVICE FOR A JOINT

BACKGROUND OF THE INVENTION

1. Field of the Invention

The present invention relates to a setting device, and more particularly to a setting device for a joint used in several kinds of wheel type trolleys, such as a shopping trolley, a luggage cart or a wheelchair.

2. Description of Related Art

Trolleys are popular devices for carrying luggage or shopping etc., however, the frame of such a trolley occupies too much space and so the frame must be folded to reduce the volume of the trolley. So that a frame may be extended, closed or held in a variety of positions therebetween flexible retaining members are located within tubes to provide locking means at desired positions of the frame. Such flexible members have a domed lug protruding from the frame whereby two tubes are locked in position together. However it is found that it is difficult for a user to depress the domed lug as it is small and not easily manipulated, particularly by an older person. Thus there has been a long and unfulfilled need for a setting device to enable a flexible retaining member mounted to a joint of a trolley etc. to be easily manipulated.

SUMMARY OF THE INVENTION

The primary object of the present invention is to provide a setting device for a joint of a trolley which can enable a flexible retaining member fitted thereto to be easily manipulated thereby allowing the trolley to be easily converted from one status to another desired status.

In accordance with the present invention, there is provide a setting device comprising a body, a pivot arm, a flexible retaining member, an upper tube and a lower tube. The body is substantially box-like with one edge having a large radiused corner and an opposite edge defining a U-shaped longitudinal opening. A stop is integrally formed on the first side of the body. The pivot arm has a hole defined therethrough near a first end thereof and a knob projecting perpendicularly from a second end thereof. The upper tube is pivotally secured in the body by a rivet extending respectively through the bole in the pivot arm, a central hole in a first side of the body, a through-hole in the upper tube and a central hole in a second side of the body. A plurality of location holes are defined in a first side of the body in a semi-circular arrangement around the central hole in the first side of the body.

The lower tube is fixedly secured in the body.

The flexible retaining member is fixedly secured by one end thereof in the upper tube and has a second end on which a lug is formed. The lug extends through a hole in the upper tube and one of the plurality of location holes aligned therewith, to project beyond the body, thereby locking the upper tube in a desired position. To disengage the lug from the body so that the upper tube may moved to a new position, the pivot arm is moved from a resting position against the stop to slide over the protruding lug end thereby depressing the lug and minimizing engagement between the lug and the body.

BRIEF DESCRIPTION OF THE DRAWINGS

FIG. 5 is a side view of the setting device of the present invention fitted in a cart; and FIG. 6 is a side view of the setting device of the present invention fitted in a wheelchair.

DETAILED DESCRIPTION OF THE PREFERRED EMBODIMENTS

Figure 1:
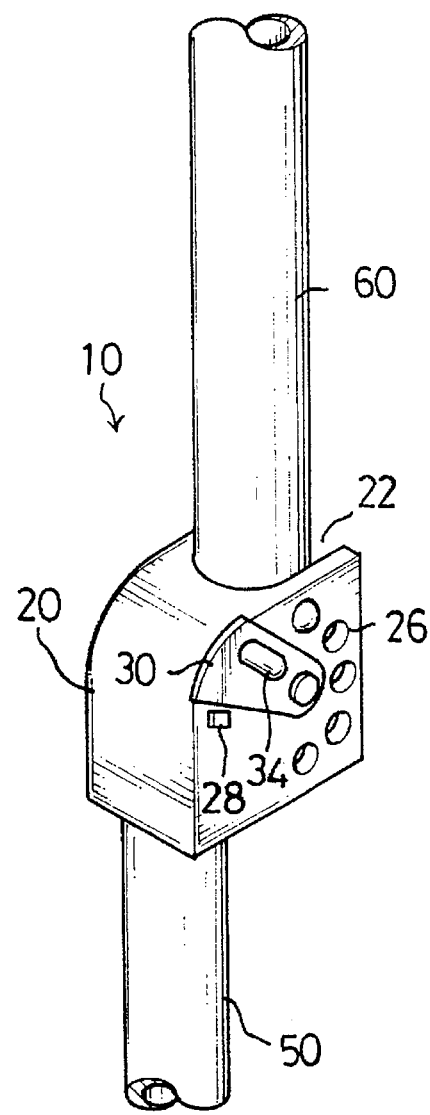
FIG. 1 is a perspective view of a setting device for a joint of a wheel type trolley in accordance with the present invention.

Referring to drawings and in particular FIG. 1, a setting device 10 in accordance with the present invention comprises a body 20, a pivot arm 30 and a flexible retaining member 40.

The body 20 is substantially box-like with one large radiused corner at one edge thereof and a longitudinal U-shaped opening 22 defined in an opposite edge. A central hole 24 extends through a first face and a second face of the body 20, said central hole 24 being a center point for the radiused corner. A plurality of location holes 26 are defined in a semi-circular arrangement around the central hole 24, on a first portion of the body 20. A stop 28 is integrally formed in the first face of the body 20, projecting outwardly therefrom and on a second portion thereof, opposite to the holes 26.

The pivot arm 30 has a hole 32 defined through a first end thereof. A knob 34 extends from a first face near a second end of the pivot arm 30.

Figure 3:
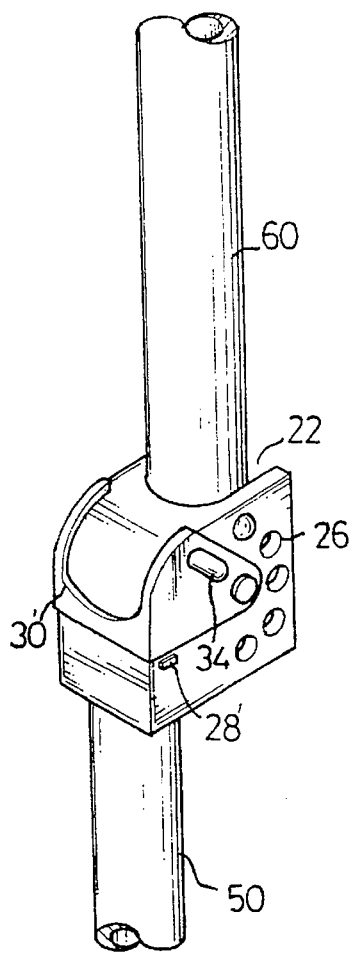
FIG. 3 is a perspective view of the setting device in accordance with another embodiment of the present invention.

As seen in FIG. 3, the pivot arm 30' may also be U-shaped and sized to fit over the body.

A lower tube 50 is fixedly received in the U-shaped opening 22. An upper tube 60 is pivotally received in the U-shaped opening 22, substantially adjacent to the lower tube 50 and retained in position by a rivet 70 extending sequentially through the hole 32 in the pivot arm 30, the central hole 24 of the first face of the body 20, a hole 62 defined near an end of the upper tube 60, the central hole 24 in the second face of the body 20, after which a distal tip of the rivet 70 is deformed. Alternatively, a bolt and nut may replace the rivet 70. The upper tube 60 is retained at a position sufficiently distant from the lower tube 50 to permit it to pivot 180° from a first position extending away from the lower tube 50 to a second position, closely adjacent to the lower tube 50, as best seen by the phantom lines in FIG. 6.

Figure 2A:
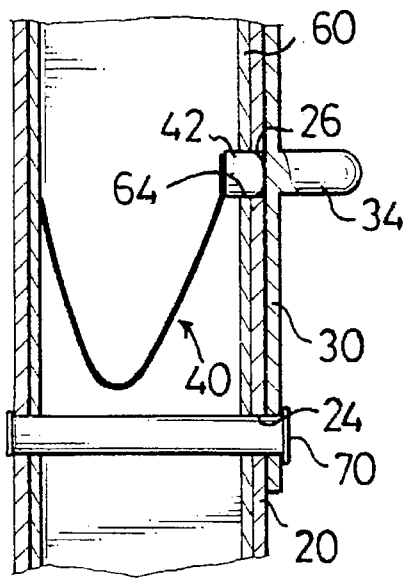
FIG. 2A and 2B are side cross-sectional views of the setting device of the FIG. 1 showing the setting device in a disengaged state and an engaged state, respectively.
Figure 2B:
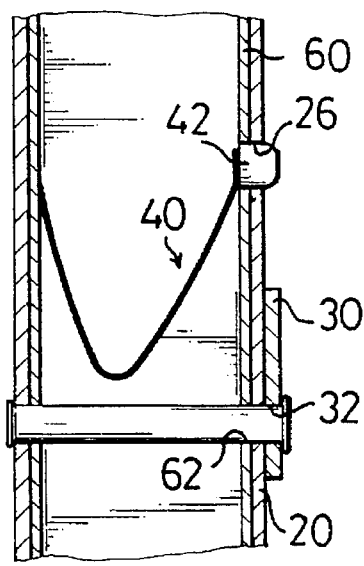

Referring to FIGS. 2A and 2B, the upper tube 60 contains the flexible retaining member 40 near the rivet 70 extending therethrough.

The flexible retaining member 40 has a first end securely attached to an inner wall of the upper tube 60 and a second end on which a lug 42 is formed.

The lug 42 has a domed distal tip. Such flexible retaining members are well known and not described in further detail here.

An orifice 64 is defined in the upper tube 60 for the lug 42 of the flexible retaining member 40 to extend therethrough. A distance between the hole 62 and the orifice 64 of the upper tube 60 is equal to a distance between the central hole 24 and each of the plurality of location holes 26 of the body 20.

Thus, the upper tube 60 may be moved and then retained in a variety of positions by the lug 42 of the flexible retaining member 40 extending through the aligned orifice 64 and one of the plurality of holes 26. So that the upper tube 60 may be moved from one position to another position, the lug 42 of the flexible retaining member 40 must be pushed inwardly. To accomplish this easily, a user grasps the knob 34 so that the pivot arm 30 or 30' is slid to a position where it covers the lug 42 projecting out of the hole 26 thereby depressing the lug 42. As the lug 42 has a domed tip it is easily disengaged from a periphery defining the holes 42 and so the upper tube 60 can be pivoted easily to a further position where the lug 42 can extend through another hole 26. The pivot arm 30 is then returned to its position abutting the stop 28 or 28'.

Accordingly, a setting device in accordance with the present invention has the following advantages and benefits:

(1) The lug is easily fitted to and detached from the one of the location holes so that the upper tube can be pivoted and located in a desired place.

(2) The setting device is simple in structure, so being convenient in operating.

Figure 4:
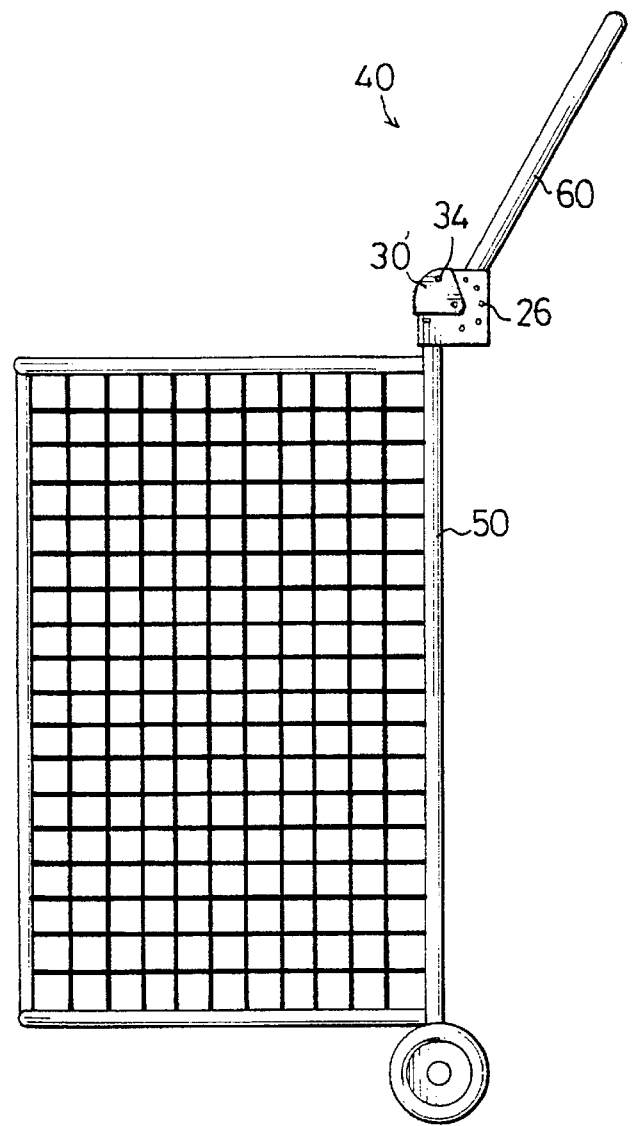
FIG. 4 is a side view of the setting device of the present invention fitted to a shopping trolley.

(3) The setting device is able to be fitted for all equipment where a joint is employed, such as a shopping trolley, a luggage cart or a wheelchair, as seen in FIGS. 4, 5 and 6.

It should be clear to those skilled in the art that further embodiments of the present invention may be made without departing from the teachings of the present invention.

What is claimed is:

1. A setting device for a joint comprising:

a body with an opening defined in one edge thereof, a plurality of location holes in one side thereof, a central hole extending through the side and a stop projecting from the side;

a pivot arm defining a hole near a first end thereof and a grasping element projecting from a second end thereof, wherein said pivot arm is operable between a first position where the pivot arm abuts said stop and a second position where said grasping element may align with one of said location holes;

an upper member pivotally secured in the opening of the body and containing a flexible retaining device therein, said flexible retaining device having a first end secured to the upper member and a second end terminating in a lug which extends through a hole defined in a wall of the upper member and an aligned one of the location holes to protrude beyond the body; and connecting means disposed through the hole of the pivot arm, the central hole of the body, and the upper member to pivotally secure the pivot arm and the upper member to the body;

wherein said pivot arm being in said first position when said lug extends through and beyond said body and said pivot arm covers said aligned one of said location holes in the second position thereby depressing said lug and minimizing a locking effect between said lug and said body for enabling the upper member to be moved to align the lug with another one of said location holes.

2. A setting device for a joint as claimed in claim 1 wherein the grasping element of the pivot arm is a knob.

3. A setting device for a joint as claimed in claim 1 wherein the opening of the body is U-shaped.

4. A setting device for a joint as claimed in claim 1 wherein the location holes are defined in a semi-circular arrangement.

5. A setting device for a joint as claimed in claim 1 wherein the location holes are defined in a portion of the side of the body opposite to a portion of the side of the body from which the stop projects.

6. A setting device for a joint comprising:

a body defined by at least one edge and at least one side, with an opening formed in the edge, a plurality of location holes formed in the side, a central hole extending through the side and a stop projecting from the side;

a pivot arm defined by a first end and a second end, with a hole formed near the first end and a grasping element projecting from the second end;

an upper member defined by at least one wall, with a hole formed in the wall, the upper member containing a flexible retaining device having a first end secured to the upper member and a second end terminating in a lug; and a connector extending through the hole of the pivot arm, the central hole of the body, and the upper member to pivotally secure the pivot arm and the upper member to the body;

wherein:

the pivot arm is operable between a first position where the pivot arm abuts the stop and a second position where the grasping element aligns with one of the location holes;

the upper member is pivotally secured in the opening of the body;

the lug of the flexible retaining device extends through the hole in the wall of the upper member and an aligned one of the location holes to protrude beyond the body;

the pivot arm allows the lug to extend through and beyond the body in the first position; and the pivot arm covers the aligned one of said location holes in the second position, thereby depressing the lug and minimizing a locking effect between the lug and the body for enabling the upper member to be moved to align the lug with another one of the location holes.

7. A setting device for a joint as claimed in claim 6 wherein the grasping element of the pivot arm is a knob.

8. A setting device for a joint as claimed in claim 6 wherein the opening of the body is U-shaped.

9. A setting device for a joint as claimed in claim 6 wherein the location holes are defined in a semi-circular arrangement.

10. A setting device for a joint as claimed in claim 6 wherein the location holes are defined in a portion of the side of the body opposite to a portion of the side of the body from which the stop projects.

* * * * *